(12) United States Patent
Park et al.

(10) Patent No.: US 12,072,535 B2
(45) Date of Patent: Aug. 27, 2024

(54) DISPLAY DEVICE

(71) Applicant: SAMSUNG ELECTRONICS CO., LTD., Suwon-si (KR)

(72) Inventors: Soomoon Park, Seoul (KR); Tetsuo Ariyoshi, Seongnam-si (KR); Ilseop Won, Hwaseong-si (KR); Jongpil Won, Hwaseong-si (KR); Sangwoo Ha, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 17/698,629

(22) Filed: Mar. 18, 2022

(65) Prior Publication Data

US 2023/0011557 A1    Jan. 12, 2023

(30) Foreign Application Priority Data

Jul. 8, 2021 (KR) .................. 10-2021-0089943

(51) Int. Cl.
  *G02B 6/34* (2006.01)
  *G02B 27/01* (2006.01)

(52) U.S. Cl.
  CPC ........... *G02B 6/34* (2013.01); *G02B 27/0101* (2013.01); *G02B 27/0172* (2013.01); *G02B 2027/011* (2013.01); *G02B 2027/0178* (2013.01)

(58) Field of Classification Search
  CPC ............ G02B 27/0172; G02B 27/0101; G02B 2027/0178; G02B 2027/011; G02B 6/34
  See application file for complete search history.

(56) References Cited

U.S. PATENT DOCUMENTS

| | | | |
|---|---|---|---|
| 7,502,168 B2 | 3/2009 | Akutsu et al. | |
| 8,189,263 B1* | 5/2012 | Wang | G02B 27/0172 |
| | | | 359/633 |
| 8,446,675 B1* | 5/2013 | Wang | G02B 6/34 |
| | | | 359/633 |
| 9,946,069 B2* | 4/2018 | Valera | G02B 6/0055 |
| 10,162,180 B2 | 12/2018 | Cakmakci et al. | |
| 10,345,506 B1* | 7/2019 | Lyu | G01B 11/00 |
| 10,539,793 B2 | 1/2020 | Mukawa | |
| 10,677,976 B2 | 6/2020 | Mukhtarov et al. | |
| 10,678,055 B2* | 6/2020 | Edwin | G02B 27/0172 |

(Continued)

FOREIGN PATENT DOCUMENTS

| | | | |
|---|---|---|---|
| CN | 109445096 A | * | 3/2019 |
| CN | 112462521 A | * | 3/2021 |

(Continued)

*Primary Examiner* — Michelle R Connelly
*Assistant Examiner* — Mary A El-Shammaa
(74) *Attorney, Agent, or Firm* — Sughrue Mion, PLLC

(57) ABSTRACT

Provided is a display device including a light guide plate; a reflective prism configured to reflect an imaging beam toward the light guide plate, wherein the imaging beam reflected by the reflective prism travels within the light guide plate at an angle greater than a critical angle of the light guide plate; and a diffraction grating configured to diffract the imaging beam traveling within the light guide plate to an angle less than or equal to the critical angle of the light guide plate, wherein the reflective prism includes a first surface in contact with the light guide plate, and a second surface configured to reflect the imaging beam.

17 Claims, 8 Drawing Sheets

(56) References Cited

U.S. PATENT DOCUMENTS

| | | | |
|---|---|---|---|
| 10,859,833 B2 | 12/2020 | Bablumyan | |
| 11,209,650 B1 * | 12/2021 | Trail | G02B 6/0023 |
| 2006/0291021 A1 * | 12/2006 | Mukawa | G02B 27/0944 |
| | | | 359/15 |
| 2008/0304123 A1 * | 12/2008 | Wang | G02B 6/34 |
| | | | 359/558 |
| 2010/0067110 A1 * | 3/2010 | Hadad | G02B 5/04 |
| | | | 359/485.06 |
| 2010/0111472 A1 * | 5/2010 | DeJong | G02B 27/0081 |
| | | | 385/31 |
| 2013/0279017 A1 | 10/2013 | Amitai | |
| 2017/0336552 A1 * | 11/2017 | Masuda | G02B 27/0101 |
| 2018/0196271 A1 | 7/2018 | Hong et al. | |
| 2018/0284440 A1 * | 10/2018 | Popovich | G02B 27/0172 |
| 2019/0129085 A1 * | 5/2019 | Waldern | G02B 6/0036 |
| 2020/0041793 A1 * | 2/2020 | Kadono | G02F 1/155 |
| 2020/0278554 A1 * | 9/2020 | Schultz | G02B 6/0031 |
| 2021/0011300 A1 | 1/2021 | Leister et al. | |
| 2021/0018753 A1 | 1/2021 | Browy et al. | |
| 2023/0011557 A1 * | 1/2023 | Park | G02B 27/0101 |

FOREIGN PATENT DOCUMENTS

| | | | | |
|---|---|---|---|---|
| JP | 2015-149700 A | 8/2015 | | |
| KR | 10-1982637 B1 | 5/2019 | | |
| WO | WO-2018009467 A1 * | 1/2018 | | G02B 27/0081 |
| WO | 2021/016045 A1 | 1/2021 | | |

\* cited by examiner

DISPLAY DEVICE

CROSS-REFERENCE TO RELATED APPLICATION

This application is based on and claims priority under 35 U.S.C. § 119 to Korean Patent Application No. 10-2021-0089943, filed on Jul. 8, 2021, in the Korean Intellectual Property Office, the disclosure of which is incorporated by reference herein in its entirety.

BACKGROUND

The present disclosure relates to a display device, and more particularly, to a display device configured to generate an augmented reality image, a virtual image, and the like.

A head mounted display (HMD) is an image display device that may be worn on the head like glasses or a helmet to view large images. In general, the HMD is configured to provide a virtual image by enlarging a panel of 1 inch or less through a plurality of optical systems. When designing the optical system of the HMD in consideration of the size of the pupil, the distance between the optical system and the eye (eye relief) for viewing a virtual image, magnification ratio, and field of view (FOV) to realize a virtual screen, optical elements such as many lens mirrors and a half mirror are required. Accordingly, the HMD has a disadvantage in that the HMD is bulky and heavy, and also that the difficulty of the manufacturing process of the HMD is high because a large number of devices must be mounted in a narrow space.

When the HMD system is implemented using a diffraction grating, the number of optical elements is significantly reduced, so that the system may be more easily configured in a narrow space and is advantageous in weight reduction compared to a related HMD system.

SUMMARY

One or more example embodiments provide a display device having improved light efficiency.

According to an aspect of an example embodiment, there is provided a display device including: a light guide plate; a reflective prism configured to reflect an imaging beam toward the light guide plate, wherein the imaging beam reflected by the reflective prism travels within the light guide plate at an angle greater than a critical angle of the light guide plate; and a diffraction grating configured to diffract the imaging beam traveling within the light guide plate to an angle less than or equal to the critical angle of the light guide plate, wherein the reflective prism includes a first surface in contact with the light guide plate, and a second surface configured to reflect the imaging beam.

According to an aspect of an example embodiment, there is provided a display device including: a light guide plate; a first reflective prism provided on a lower surface of the light guide plate and configured to reflect a first imaging beam incident on the light guide plate from an upper surface opposite to the lower surface of the light guide plate, wherein the first imaging beam reflected by the first reflective prism travels within the light guide plate at an angle greater than a critical angle of the light guide plate; a second reflective prism provided on the lower surface of the light guide plate and configured to reflect a second imaging beam incident from the upper surface of the light guide plate to the light guide plate, wherein the second imaging beam reflected by the second reflective prism travels at an angle greater than the critical angle within the light guide plate; a third reflective prism provided on the lower surface of the light guide plate and configured to reflect a third imaging beam incident on the light guide plate from the upper surface of the light guide plate, wherein the third imaging beam reflected by the third reflective prism travels within the light guide plate at an angle greater than the critical angle; and a diffraction grating provided on a first surface of the light guide plate and spaced apart from the first reflective prism, the second reflective prism, and the third reflective prism, the diffraction grating being configured to diffract each of the first imaging beam, the second imaging beam, and the third imaging beam to an angle less than or equal to the critical angle.

According to an aspect of an example embodiment, there is provided a head mount display including: a light guide plate including an upper surface on which an imaging beam is incident and a lower surface opposite to the upper surface; a reflective prism provided on the lower surface of the light guide plate; and a diffraction grating provided on the lower surface of the light guide plate, wherein a contact area between the diffraction grating and the light guide plate is greater than a contact area between the reflective prism and the light guide plate, the reflective prism is configured to reflect the imaging beam such that the imaging beam travels through total reflection within the light guide plate, and the diffraction grating is configured to diffract the imaging beam such that the imaging beam is emitted from the light guide plate.

BRIEF DESCRIPTION OF THE DRAWINGS

The above and other aspects will be more clearly understood from the following detailed description of example embodiments taken in conjunction with the accompanying drawings in which.

DETAILED DESCRIPTION

Figure 1:
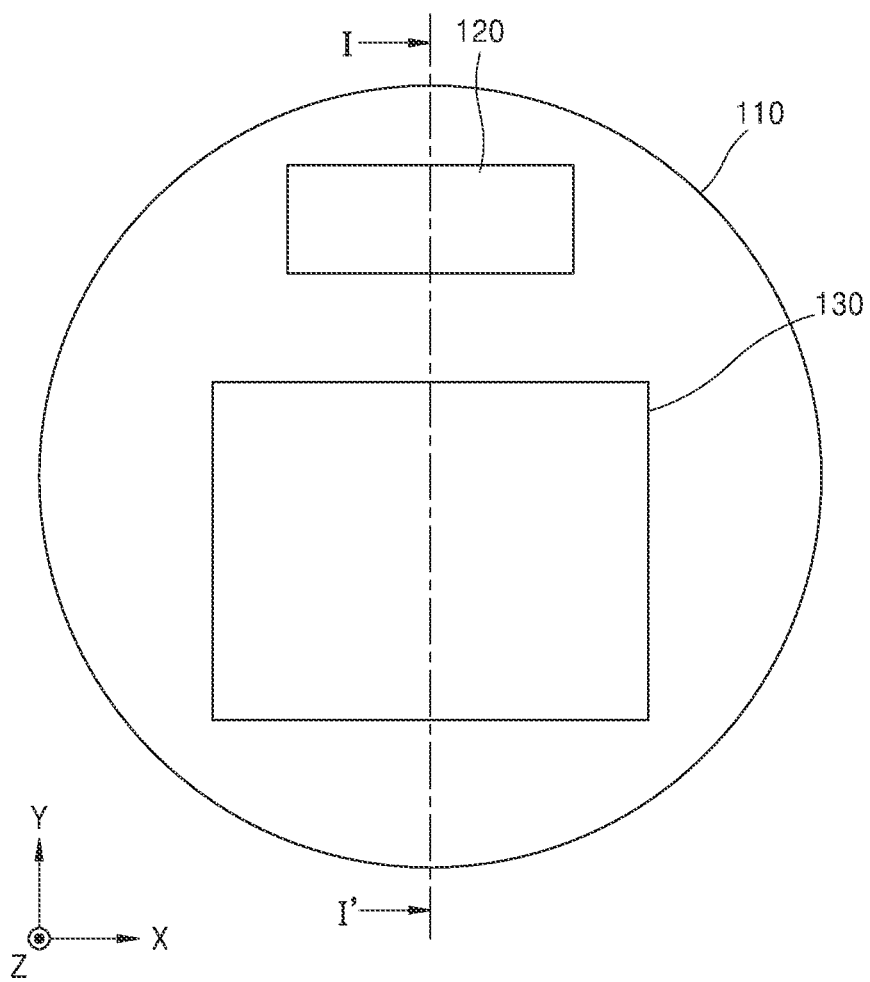
FIG. 1 is a plan view illustrating a display device according to example embodiments.

Hereinafter, example embodiments will be described in detail with reference to the accompanying drawings. The same reference numerals are used for the same components in the drawings, and the already given descriptions thereof are omitted.

FIG. 1 is a plan view illustrating a display device 100 according to example embodiments.

Figure 2:
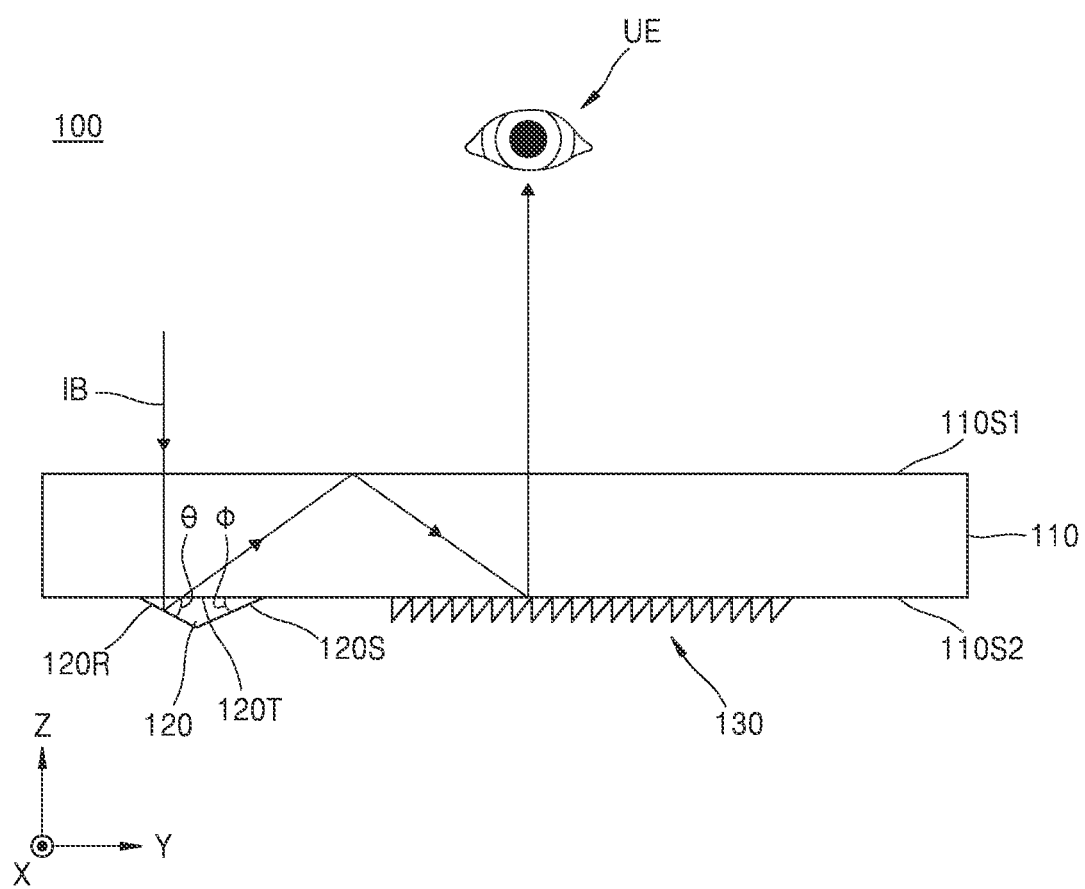
FIG. 2 is a cross-sectional view taken along line I-I" of FIG. 1.

FIG. 2 is a cross-sectional view taken along line I-I" of FIG. 1.

Referring to FIGS. 1 and 2, the display device 100 may include a light guide plate 110, a reflective prism 120, and a diffraction grating 130.

The display device 100 may generate, for example, an augmented reality image and a virtual image based on an imaging beam IB. The image generated by the display device 100 may be recognized by a user's eye UE as being located within the light guide plate 110 or beyond the light guide plate 110, for example, at a location spaced apart from the user's eye UE with the light guide plate 110 being provided between the user's eye UE and the image).

The light guide plate 110, the reflective prism 120, and the diffraction grating 130 may constitute an optical system configured to guide the imaging beam IB to the user's eye UE.

According to example embodiments, the imaging beam IB may be provided by an image generating device. According to example embodiments, the imaging beam IB may include blue visible light, green visible light, and red visible light. The wavelength of visible blue light may be, for example, about 460 nm, the wavelength of visible green light may be, for example, about 522 nm, and the wavelength of visible red light may be, for example, about 622 nm.

The imaging beam IB may be provided, for example, by a first laser device configured to generate the blue visible light based on image data, a second laser device configured to generate the green visible light based on the image data; and a third laser device configured to generate the red visible light based on the image data. According to example embodiments, the first to third laser devices described above may be included in the display device 100 or may be provided separately from the display device 100.

According to example embodiments, the display device 100 may further include various optical elements configured to guide the imaging beam IB to the light guide plate 110, such as, for example, an optical fiber, a focusing lens, a collimating lens, and a mirror.

The light guide plate 110 may include a material transparent to a visible light band. The light guide plate 110 may include, for example, plastic and glass. When the light guide plate 110 has a relatively high refractive index, the light efficiency of the light guide plate 110 may be improved. As an example, the refractive index of the light guide plate 110 may be about 1.5 or more, but embodiments are not limited thereto. As an example, the refractive index of the light guide plate 110 may be about 1.8 or more, but embodiments are not limited thereto.

The light guide plate 110 may be included in a glasses-type product such as a head mounted display (HMD), or may be a part of a front glass of a head up display (HUD). In FIG. 1, the planar shape of the light guide plate 110 is shown to be approximately circular, but this is only for illustration and embodiments are not limited thereto.

According to example embodiments, the light guide plate 110 may have a substantially flat shape. According to example embodiments, the light guide plate 110 may include a curved surface similar to a vision correcting lens. A direction in which the imaging beam IB is incident on the light guide plate 110 is defined as a Z direction, and two directions substantially perpendicular to the Z direction are defined as an X direction and a Y direction, respectively. The X and Y directions may be substantially perpendicular to each other.

The imaging beam IB may be incident on an upper surface 110S1 of the light guide plate 110. The imaging beam IB may be incident substantially perpendicular to the upper surface 110S1 of the light guide plate 110. The imaging beam IB may be incident on the light guide plate 110 in the Z direction through a portion of the light guide plate 110 overlapping the reflective prism 120.

The reflective prism 120 and the diffraction grating 130 may be arranged on a lower surface 110S2 of the light guide plate 110. The lower surface 110S2 may be opposite to the upper surface 110S1. According to example embodiments, the reflective prism 120 may be horizontally spaced apart from the diffraction grating 130 (i.e., in the X and Y directions). A portion of the light guide plate 110 overlapping the reflective prism 120 in the Z direction may be an input region, and a portion of the light guide plate 110 overlapping with the diffraction grating 130 in the Z direction may be an output region. According to example embodiments, an area of the output region may be greater than an area of the input region. As the width of the output region increases, the size of the augmented reality image and/or the virtual image recognized by the user's eye UE may increase.

In FIG. 1, the portions of the lower surface 110S2 of the light guide plate 110 in contact with the reflective prism 120 and the diffraction grating 130 are shown to be substantially rectangular in a plan view, but this is for illustration only and embodiments are not limited thereto.

According to example embodiments, the reflective prism 120 may include a material having a refractive index similar to a refractive index of the light guide plate 110. According to example embodiments, the refractive index of the reflective prism 120 may be substantially the same as that of the light guide plate 110. When the refractive index of the reflective prism 120 is substantially the same as the refractive index of the light guide plate 110, reflection or refraction of the imaging beam IB at the interface between the reflective prism 120 and the light guide plate 110 may be prevented, and thus the optical reliability of the display device 100 may be improved.

The reflective prism 120 may include a first surface 120T contacting the lower surface 110S2 of light guide plate 110, a second surface 120R configured to reflect the imaging beam IB, and a third surface 120S connected to each of the first surface 120T and the second surface 120R. As a non-limiting example, the reflective prism 120 may be a triangular prism, and may have a triangular prism shape. However, embodiments are not limited thereto, and the reflective prism 120 may have various pillar shapes such as a quadrangular pillar and a pentagonal pillar, and in some cases, the reflective prism 120 may be a free surface prism.

According to example embodiments, the first surface 120T may transmit the imaging beam IB. The imaging beam IB transmitted through the first surface 120T may reach the second surface 120R. According to example embodiments, the second surface 120R may be configured to reflect the imaging beam IB. According to example embodiments, the reflectivity of the second surface 120R to the imaging beam IB may be greater than or equal to about 80%. According to example embodiments, the reflectivity of the second surface 120R to the imaging beam IB may be greater than or equal to about 90%. According to example embodiments, the reflectivity of the second surface 120R to the imaging beam IB may be greater than or equal to about 99%.

According to example embodiments, a reflective coating may be provided on the second surface 120R. The reflective coating may include a first narrowband reflective layer corresponding to the blue visible light of the imaging beam IB, a second narrowband reflective layer corresponding to the green visible light of the imaging beam IB, and a third narrowband reflective layer corresponding to the blue visible light of the imaging beam IB.

The second surface 120R may be inclined at an angle $\theta$ with respect to the first surface 120T of the reflective prism 120. According to example embodiments, the angle $\theta$ may range from about 22° to about 37°. According to example embodiments, the angle θ may range from about 25° to about 28°. According to example embodiments, the angle θ may be about 26.9°.

According to example embodiments, an angle φ between the third surface 120S and the first surface 120T of the reflective prism 120 may be greater than or equal to about 44° and less than about 180°. According to example embodiments, the angle φ may be determined such that the imaging beam IB reflected by the second surface 120R of the reflective prism 120 is not interfered with the third surface 120S of the reflective prism 120. Accordingly, distortion of the imaging beam IB generated at the boundary between different materials (e.g., material and air constituting the reflective prism 120) may be prevented, and image quality of the display device 100 may be improved.

According to example embodiments, the second surface 120R may be configured to reflect the imaging beam IB such that the imaging beam IB travels in a direction oblique to the Z direction. According to example embodiments, the imaging beam IB reflected by the second surface 120R may pass through the first surface 120T of the reflective prism 120 and the lower surface 110S2 of the light guide plate 110, respectively, and may be incident into the light guide plate 110. The imaging beam IB may travel within the light guide plate 110 at an angle greater than a critical angle of the light guide plate 110. According to example embodiments, the imaging beam IB may travel within light guide plate 110 at an angle ranging from about 31° to about 46°. Here, the propagation angle of the imaging beam IB may be an angle with respect to the normal of the upper surface 110S1 and the lower surface 110S2 of the light guide plate 110.

The imaging beam IB, which is totally reflected and travels within the light guide plate 110, may reach the diffraction grating 130. The diffraction grating 130 may include a periodic repetition of a geometric structure such as a dot pattern or a line and space pattern. The diffraction grating 130 may be configured to diffract the imaging beam IB.

According to example embodiments, the diffraction grating 130 may diffract the imaging beam IB while reflecting the imaging beam IB. According to example embodiments, the diffraction grating 130 may direct the imaging beam IB to propagate at an angle less than or equal to a critical angle of the light guide plate 110.

The imaging beam IB reflected and diffracted by the diffraction grating 130 may travel in a direction substantially perpendicular to each of the upper surface 110S1 and the lower surface 110S2 of the light guide plate 110. According to example embodiments, the imaging beam IB reflected and diffracted by the diffraction grating 130 may be emitted from the light guide plate 110 and directed to the user's eye UE.

According to example embodiments, the imaging beam IB is reflected at an angle greater than or equal to the critical angle of the light guide plate 110 by the reflective prism 120, and thus, an augmented reality image optical system or virtual image optical system based on a single diffraction grating 130 may be implemented. According to example embodiments, the reflective prism 120 may have a relatively high reflectance with respect to the imaging beam IB, and thus, the display device 100 having greater optical efficiency than an optical system using two or more diffraction gratings may be provided.

Figure 3:
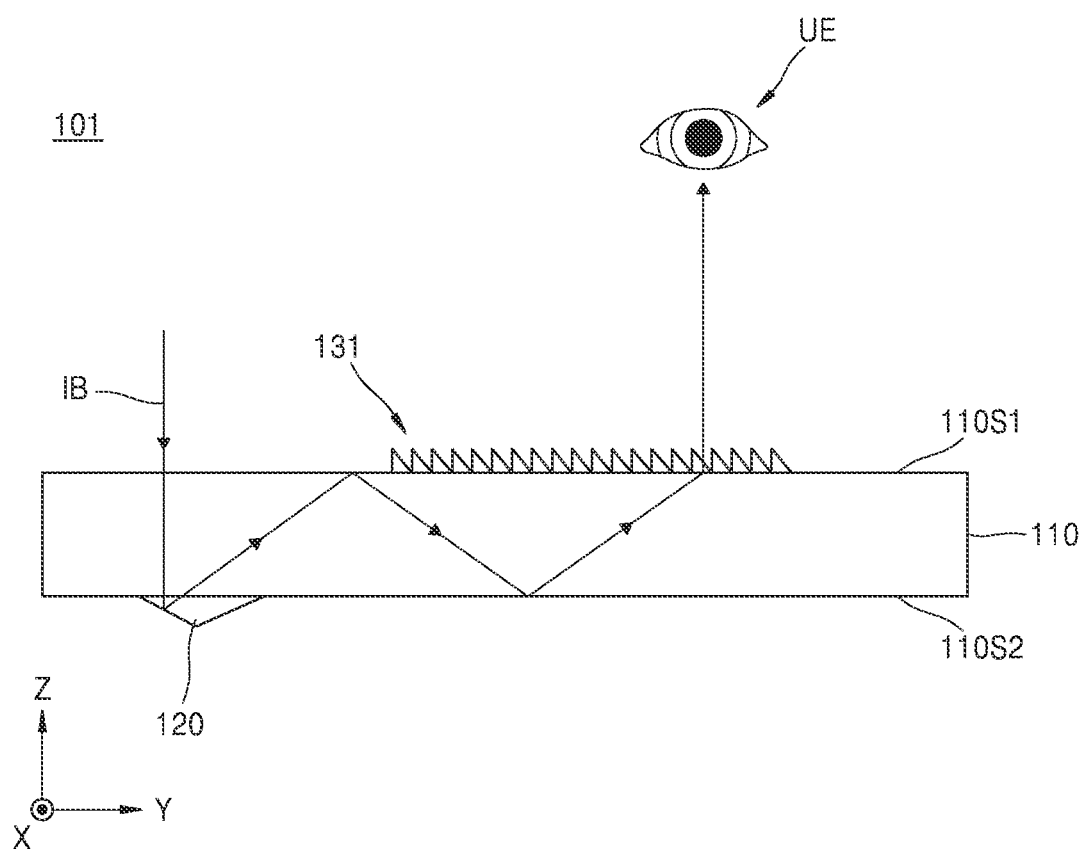
FIGS. 3, 4, and 5 are cross-sectional views illustrating display devices according to example embodiments.

FIG. 3 is a cross-sectional view illustrating a display device 101 according to an example embodiment.

Referring to FIG. 3, the display device 101 may include a light guide plate 110, a reflective prism 120, and a diffraction grating 131.

In FIG. 3, the functions and configurations of the light guide plate 110 and the reflective prism 120 are similar to those described with reference to FIGS. 1 and 2, and thus a description already given thereof is omitted.

According to example embodiments, the display device 101 may generate, for example, an augmented reality image, a virtual image, and the like, based on an imaging beam IB. The image generated by the display device 101 may be recognized by a user's eye UE as being located within the light guide plate 110 or beyond the light guide plate 110, for example, at a location spaced apart from the user's eye UE with the light guide plate 110 being provided between the user's eye UE and the image.

The light guide plate 110, the reflective prism 120, and the diffraction grating 131 may constitute an optical system configured to guide the imaging beam IB to the user's eye UE.

According to example embodiments, unlike the diffraction grating 130 shown in FIG. 2, the diffraction grating 131 may be disposed on the upper surface 110S1 of the light guide plate 110 on which the imaging beam IB is incident. Accordingly, the diffraction grating 131 may diffract the imaging beam IB reaching the diffraction grating 131 by repeating total reflection to an angle less than or equal to a critical angle of the light guide plate 110. The imaging beam IB diffracted less than or equal to the critical angle of the light guide plate 110 may pass through the diffraction grating 131 and be directed to the user's eye UE.

Figure 4:
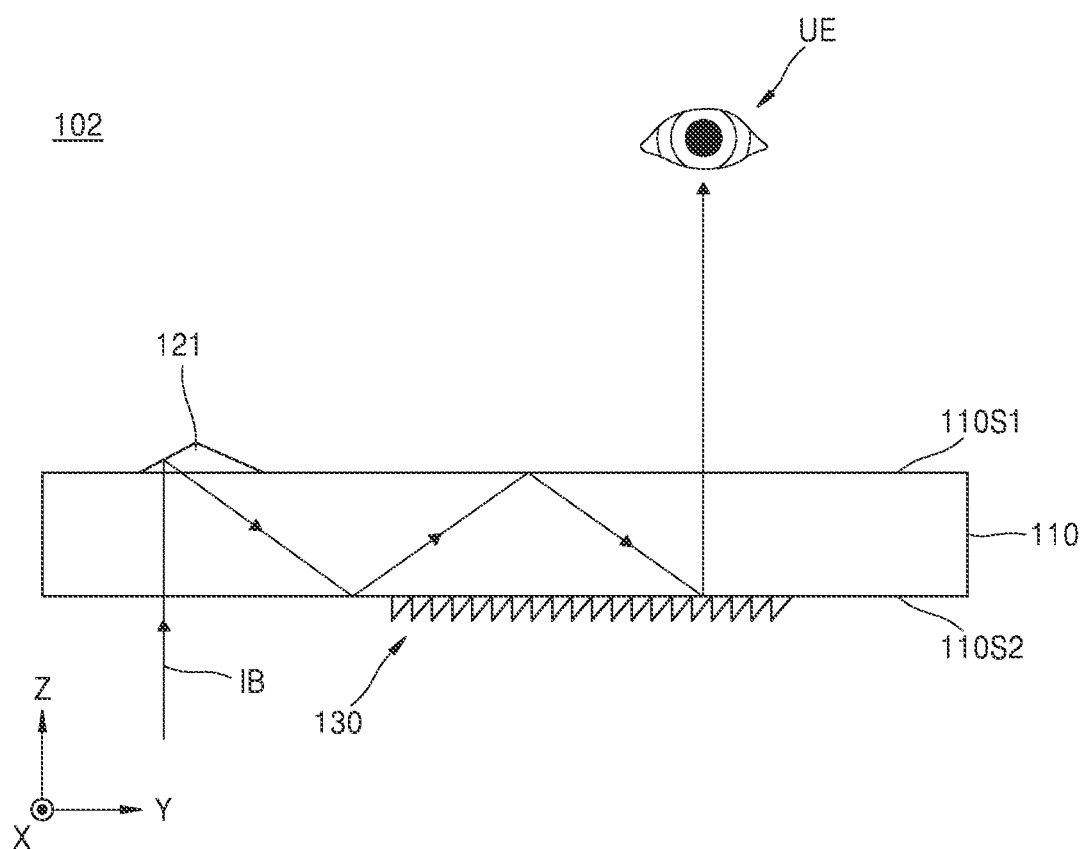

FIG. 4 is a cross-sectional view illustrating the display device 102 according to an example embodiment.

Referring to FIG. 4, the display device 102 may include a light guide plate 110, a reflective prism 121, and a diffraction grating 130.

In FIG. 4, the functions and configurations of the light guide plate 110 and the reflective prism 120 are similar to those described with reference to FIGS. 1 and 2, and thus a description already given thereof is omitted.

According to example embodiments, the display device 102 may generate, for example, an augmented reality image, a virtual image, and the like, based on the imaging beam IB. The image generated by the display device 102 may be recognized by a user's eye UE that is located within the light guide plate 110 or beyond the light guide plate 110, for example, at a location spaced apart from the user's eye UE with the light guide plate 110 being provided between the user's eye UE and the image.

In this example, the imaging beam IB may be incident on the light guide plate 110 from the lower surface 110S2 of the light guide plate 110 opposite to the upper surface 110S1 facing the user's eye UE. The light guide plate 110, the reflective prism 121 and the diffraction grating 130 may constitute an optical system configured to guide the imaging beam IB incident from the lower surface 110S2 of the light guide plate 110 to the user's eye UE.

According to example embodiments, the reflective prism 121 is similar to the reflective prism 120 shown in FIG. 2, but may be formed on the upper surface 110S1 facing the user's eye UE.

Accordingly, the reflective prism 121 may reflect the imaging beam IB at an angle greater than the critical angle of the light guide plate 110. The imaging beam IB reflected by the reflective prism 121 may be totally reflected in the light guide plate 110 to reach the diffraction grating 130. The imaging beam IB may be diffracted and reflected by the diffraction grating 130. The imaging beam IB diffracted and reflected by the diffraction grating 130 may be emitted from the light guide plate 110 and directed to the user's eye UE.

Figure 5:
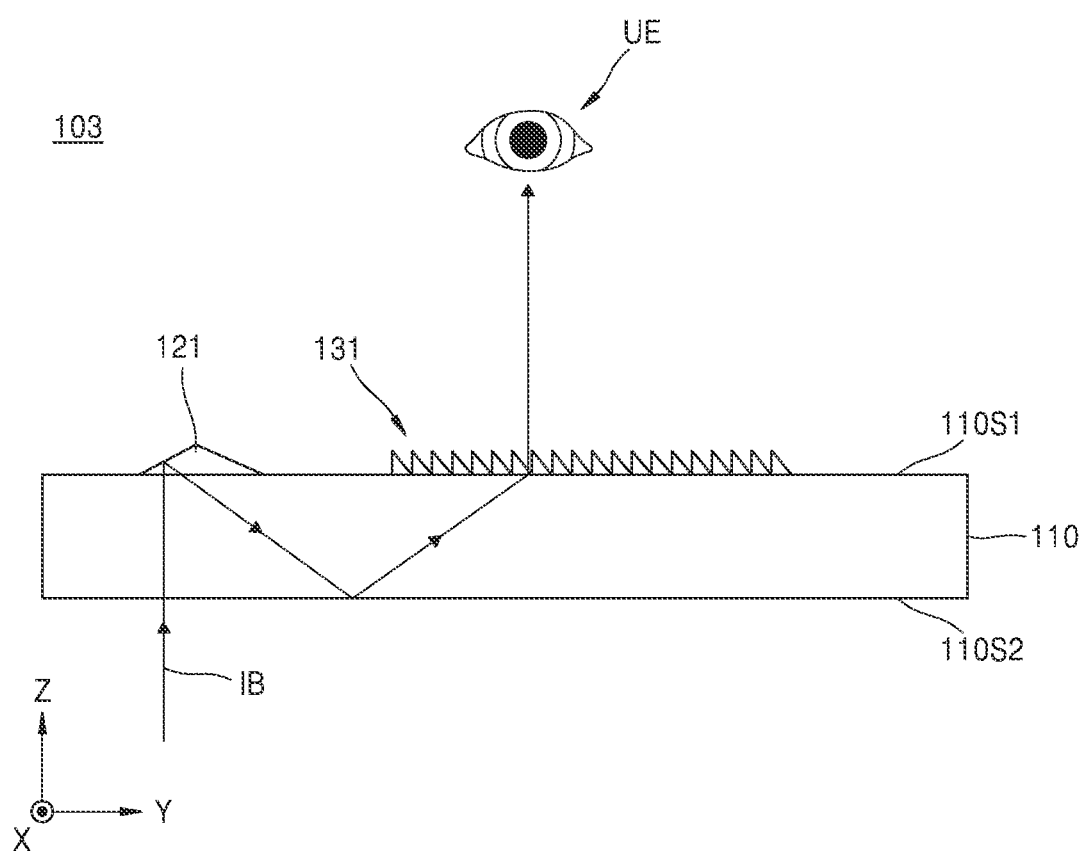

FIG. 5 is a cross-sectional view illustrating a display device 103 according to an example embodiment.

Referring to FIG. 5, the display device 103 may include a light guide plate 110, a reflective prism 121, and a diffraction grating 131.

In FIG. 5, the function and configuration of the light guide plate 110 are similar to those described with reference to FIGS. 1 and 2, and thus a description already given thereof is omitted.

According to example embodiments, the display device 103 may generate, for example, an augmented reality image, a virtual image, and the like, based on the imaging beam IB. The image generated by the display device 103 may be recognized by a user's eye UE as being located within the light guide plate 110 or beyond the light guide plate 110, for example, at a location spaced apart from the user's eye UE with the light guide plate 110 being provided between the user's eye UE and the image.

In this example, the imaging beam IB may be incident on the light guide plate 110 from the lower surface 110S2 of the light guide plate 110 opposite to the upper surface 110S1 facing the user's eye UE. The light guide plate 110, the reflective prism 121, and the diffraction grating 131 may constitute an optical system configured to guide the imaging beam IB incident on the light guide plate 110 from the lower surface 110S2 to the user's eye UE.

According to example embodiments, the reflective prism 121 may be disposed on the upper surface 110S1 facing the user's eye UE, similar to that illustrated in FIG. 4. According to example embodiments, the diffraction grating 131 may be disposed on the upper surface 110S1 similarly to that illustrated in FIG. 3.

Figure 6:
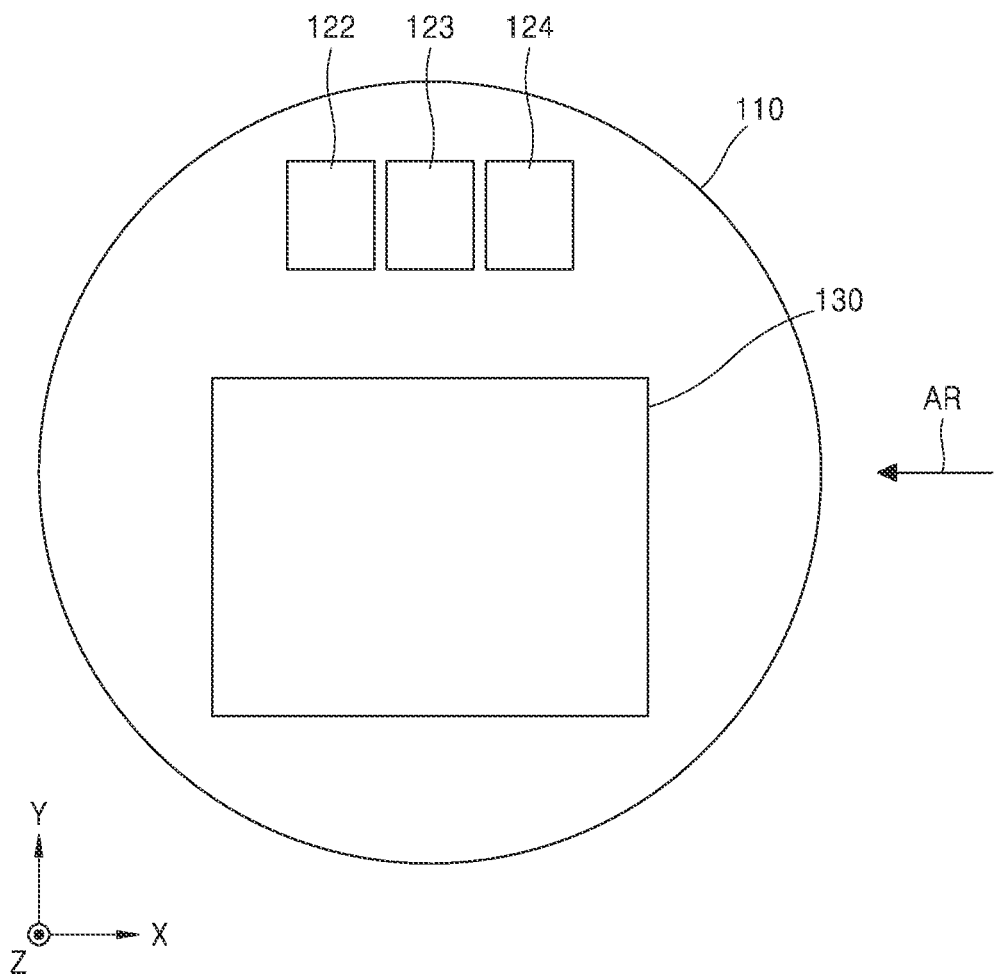
FIG. 6 is a plan view illustrating a display device according to example embodiments.

FIG. 6 is a plan view illustrating a display device 104 according to an example embodiment.

Figure 7:
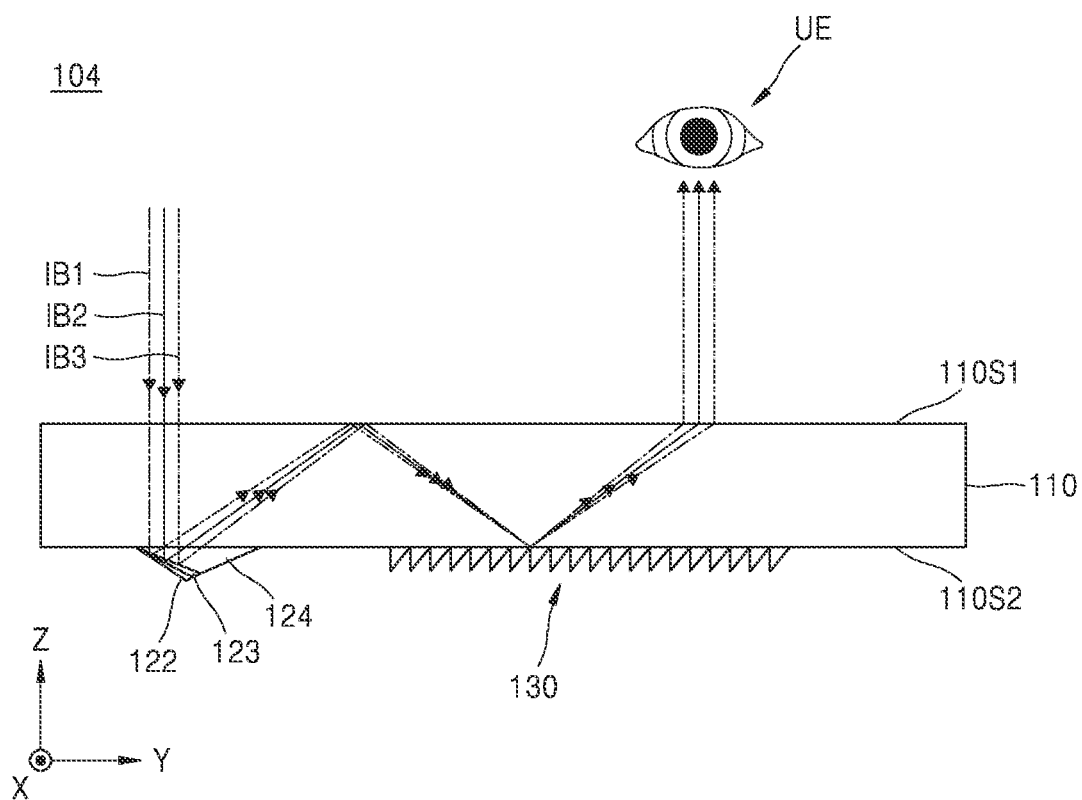
FIG. 7 is a side view of the display device of FIG. 6.

FIG. 7 is a side view of the display device 104 of FIG. 6 in the direction of the arrow AR.

Figure 8:
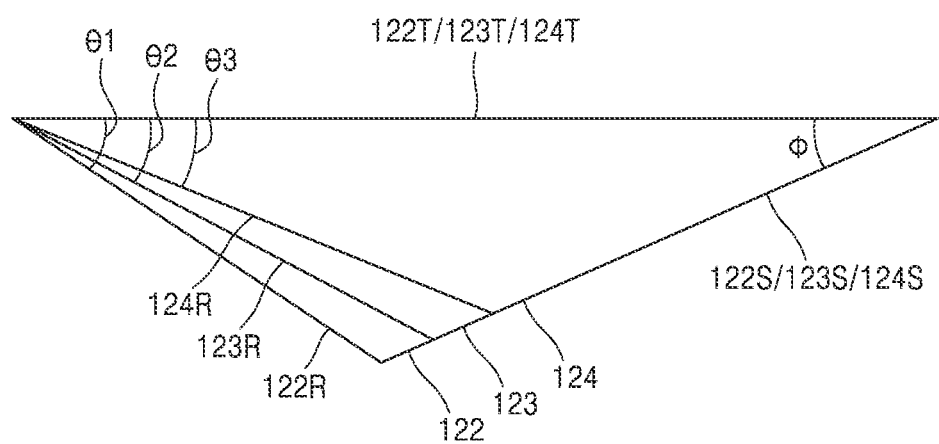
FIG. 8 is a partial side view illustrating an enlarged part of FIG. 7.

FIG. 8 is an enlarged partial side view of a first reflective prism 122, a second reflective prism 123, and a third reflective prism 124 of FIG. 7.

Referring to FIGS. 6 to 8, the display device 104 may include a light guide plate 110, the first reflective prism 122, the second reflective prism 123, and the third reflective prism 124, and a diffraction grating 130.

In FIGS. 6 to 8, the functions and configurations of the light guide plate 110 and the diffraction grating 130 are similar to those described with reference to FIGS. 1 and 2, and thus a description already given thereof is omitted.

According to example embodiments, the display device 104 may generate, for example, an augmented reality image and a virtual image based on a first imaging beam IB1, a second imaging beam IB2, and a third imaging beam IB3. The image generated by the display device 104 may be recognized by a user's eye UE as being located within the light guide plate 110 or beyond the light guide plate 110, for example, at a location spaced apart from the user's eye UE with the light guide plate 110 being provided between the user's eye UE and the image.

The first imaging beam IB1 may be generated, for example, by a first laser device configured to generate blue visible light based on image data, the second imaging beam IB2 may be generated, for example, by a second laser device configured to generate green visible light based on the image data, and the third imaging beam IB3 may be generated, for example, by a third laser device configured to generate a red visible light based on the image data. According to example embodiments, the first to third laser devices described above may be included in the display device 104 or may be provided separately from the display device 104.

As a non-limiting example, the wavelength of the first imaging beam IB1 may be about 460 nm, the wavelength of the second imaging beam IB2 may be about 522 nm, and the wavelength of the third imaging beam IB3 may be 622 nm. However, embodiments are not limited thereto.

The light guide plate 110, the first reflective prism 122, the second reflective prism 123, and the third reflective prism 124, and the diffraction grating 130 may constitute an optical system for guiding the first imaging beam IB1, the second imaging beam IB2, and the third imaging beam IB3 to the user's eye UE.

The first reflective prism 122, the second reflective prism 123, and the third reflective prism 124 may be arranged to be spaced apart from each other in the X direction. The diffraction grating 130 may be spaced apart from each of the first reflective prism 122, the second reflective prism 123, and the third reflective prism 124 in the Y direction.

As a non-limiting example, each of the first reflective prism 122, the second reflective prism 123, and the third reflective prism 124 may be a triangular prism and may have a triangular prism shape. However, a shape of each of the first reflective prism 122, the second reflective prism 123, and the third reflective prism 124 is not limited thereto, and the first reflective prism 122, the second reflective prism 123, and the third reflective prism 124 may have various pillar shapes such as, for example, a quadrangular pillar and a pentagonal pillar, and in some cases, may be a free surface prism.

According to example embodiments, the first reflective prism 122, the second reflective prism 123, and the third reflective prism 124 may have different shapes. For example, the first reflective prism 122, the second reflective prism 123, and the third reflective prism 124 may be triangular prisms having different shapes. As another example, the first reflective prism 122 and the second reflective prism 123 may be triangular prisms, and the third reflective prism 124 may be a free-curved prism.

As shown in FIG. 8, the first reflective prism 122 may include a first surface 122T in contact with the lower surface 110S2 of the light guide plate 110, a second surface 122R configured to reflect the first imaging beam IB1, a third surface 122S connected to each of the first surface 122T and the second surface 122R.

According to example embodiments, the first surface 122T may transmit the first imaging beam IB1. The first imaging beam IB1 transmitted through the first surface 122T may reach the second surface 122R. According to example embodiments, the second surface 122R may be configured to reflect the first imaging beam IB1. According to example embodiments, the reflectivity of the second surface 122R with respect to the first imaging beam IB1 may be greater than or equal to about 80%. According to example embodiments, the reflectivity of the second surface 122R with respect to the first imaging beam IB1 may be greater than or equal to about 90%. According to example embodiments, the reflectivity of the second surface 122R with respect to the first imaging beam IB1 may be greater than or equal to about 99%.

According to example embodiments, a first reflective coating may be provided on the second surface 122R. The first reflective coating may be a first narrow band reflective layer for a blue visible light band component. The first reflective coating may have a reflective bandwidth of, for example, about 50 nm. The center frequency of the first reflective coating may be about 460 nm, but is not limited thereto.

The second surface 122R may be inclined at a first angle $\theta1$ with respect to the first surface 122S. According to example embodiments, the first angle $\theta1$ may range from about 22° to about 37°. According to example embodiments, the first angle $\theta1$ may range from about 25° to about 28°.

According to example embodiments, the second surface 122R may be configured to reflect the first imaging beam IB1 such that the first imaging beam IB1 travels in a direction oblique to the Z direction. According to example embodiments, the imaging beam IB1 reflected by the second surface 122R may pass through the first surface 122T of the reflective prism 122 and the lower surface 110S2 of the light guide plate 110, respectively, and may be incident into the light guide plate 110. The first imaging beam IB1 within the light guide plate 110 may travel within the light guide plate 110 at an angle greater than a critical angle of the light guide plate 110. According to example embodiments, the first imaging beam IB1 may travel within the light guide plate 110 at an angle ranging from about 31° to about 46°. Here, the traveling angles of the first imaging beam IB1 and the second and third imaging beams IB2 and IB3 to be described later indicate angles with respect to the normal of the upper surface 110S1 and the normal of the lower surface 110S2 of the light guide plate 110.

The second reflective prism 123 may include a first surface 123T in contact with the light guide plate 110, a second surface 123R configured to reflect the second imaging beam IB2, and a third surface 123S connected to each of the first surface 123T and the second surface 123R.

According to example embodiments, the first surface 123T may transmit the second imaging beam IB2. The second imaging beam IB2 transmitted through the first surface 123T may reach the second surface 123R. According to example embodiments, the second surface 123R may be configured to reflect the second imaging beam IB2. According to example embodiments, the reflectivity of the second surface 123R with respect to the second imaging beam IB2 may be greater than or equal to about 80%. According to example embodiments, the reflectivity of the second surface 123R with respect to the second imaging beam IB2 may be greater than or equal to about 90%. According to example embodiments, the reflectivity of the second surface 123R with respect to the second imaging beam IB2 may be greater than or equal to about 99%.

According to example embodiments, a second reflective coating may be provided on the second surface 123R. The second reflective coating may be a second narrow band reflective layer for a green visible light band component. The second reflective coating may have a reflective bandwidth of, for example, about 50 nm. A center frequency of the second reflective coating may be about 522 nm, but is not limited thereto.

The second surface 123R may be inclined at a second angle $\theta2$ with respect to the first surface 123S. According to example embodiments, the second angle $\theta2$ may range from about 22° to about 37°. According to example embodiments, the second angle $\theta2$ may range from about 25° to about 28°.

According to example embodiments, the second surface 123R may be configured to reflect the second imaging beam IB2 such that the second imaging beam IB2 travels in a direction oblique to the Z direction. According to example embodiments, the second imaging beam IB2 reflected by the second surface 123R may pass through the first surface 123T of the second reflective prism 123 and the lower surface 110S2 of the light guide plate 110, respectively, and may be incident into the light guide plate 110. The second imaging beam IB2 within the light guide plate 110 may travel within the light guide plate 110 at an angle greater than a critical angle of the light guide plate 110. According to example embodiments, the second imaging beam IB2 may travel within the light guide plate 110 at an angle ranging from about 31° to about 46°. An angle at which the second imaging ray IB2 travels through total reflection within the light guide plate 110 may be smaller than an angle at which the first imaging ray IB1 travels through total reflection within the light guide plate 110.

The third reflective prism 124 may include a first surface 124T in contact with the light guide plate 110, a second surface 124R configured to reflect the third imaging ray IB3, and a third surface 124S connected to each of the first surface 124T and the second surface 124R.

According to example embodiments, the first surface 124T may transmit the third imaging beam IB3. The third imaging beam IB3 transmitted through the first surface 124T may reach the second surface 124R. According to example embodiments, the second surface 124R may be configured to reflect the third imaging beam IB3. According to example embodiments, the reflectivity of the second surface 124R with respect to the third imaging beam IB3 may be greater than or equal to about 80%. According to example embodiments, the reflectivity of the second surface 124R with respect to the third imaging beam IB3 may be greater than or equal to about 90%. According to example embodiments, the reflectivity of the second surface 124R to the third imaging beam IB3 may be greater than or equal to about 99%.

According to example embodiments, a third reflective coating may be provided on the second surface 124R. The third reflective coating may be a third narrow band reflective layer for a red visible light band component. The third reflective coating may have a reflective bandwidth of, for example, about 50 nm. A center frequency of the third reflective coating may be about 622 nm, but is not limited thereto.

The second surface 124R may be inclined at a first angle $\theta1$ with respect to the first surface 124S of the third reflective prism 124. According to example embodiments, the first angle $\theta1$ may range from about 22° to about 37°. According to example embodiments, the first angle $\theta1$ may range from about 25° to about 28°.

According to example embodiments, the second surface 124R may be configured to reflect the third imaging beam IB3 such that the third imaging beam IB3 travels in a direction oblique to the Z direction. According to example embodiments, the third imaging beam IB3 reflected by the second surface 124R may pass through the first surface 124T of the third reflective prism 124 and the lower surface 110S2 of the light guide plate 110, respectively, and may be incident into the light guide plate 110. The third imaging beam IB3 within the light guide plate 110 may travel within the light guide plate 110 at an angle greater than a critical angle of the light guide plate 110. According to example embodiments, the third imaging beam IB3 may travel within the light guide plate 110 at an angle ranging from about 31° to about 46°. An angle at which the third imaging beam IB3 travels through total reflection within the light guide plate 110 may be smaller than an angle at which the second imaging light beam IB2 travels through total reflection within the light guide plate 110.

According to example embodiments, the first angle $\theta1$, the second angle $\theta2$, and the third angle $\theta3$ may be different from each other. According to example embodiments, the first angle θ1 may be greater than the second angle θ2. According to example embodiments, the second angle θ2 may be greater than the third angle θ3.

In the above description, example embodiments have been described in which the first reflective prism 122, the second reflective prism 123, and the third reflective prism 124 have different shapes (that is, the first to third angles θ1, θ2, and θ3 are different from each other), but embodiments are not limited thereto, and first to third reflective prisms may have the same shape as each other.

According to example embodiments, an angle φ between the first surface 122T and the third surface 122S of the first reflective prism 122, an angle φ between the first surface 123T and the third surface 123S of the second reflective prism 123, and an angle φ between the first surface 124T and the third surface 124S of the third reflective prism 124 may be substantially equal to each other. The angle φ may be determined such that each of the first reflective prism 122, the second reflective prism 123, and the third reflective prism 124 may not interfere with the first imaging beam IB1, the second imaging beam IB2, and the third imaging beam IB3.

However, the angle φ is not limited thereto, and the angle φ between the first surface 122T and the third surface 122S of the first reflective prism 122, the angle φ between the first surface 123T and the third surface 123S of the second reflective prism 123, and the angle φ between the first surface 124T and the third surface 124S of the third reflective prism 124 may be different from each other.

The first imaging beam IB1, the second imaging beam IB2, and the third imaging beam IB3 may reach the diffraction grating 130 by total reflection proceeding within the light guide plate 110. The diffraction grating 130 may diffract each of the first imaging beam IB1, the second imaging beam IB2, and the third imaging beam IB3 to an angle less than or equal to a critical angle of the light guide plate 110. The first imaging beam IB1, the second imaging beam IB2, and the third imaging beam IB3 diffracted by the diffraction grating 130 may be directed to the user's eye UE, respectively.

Figure 9:
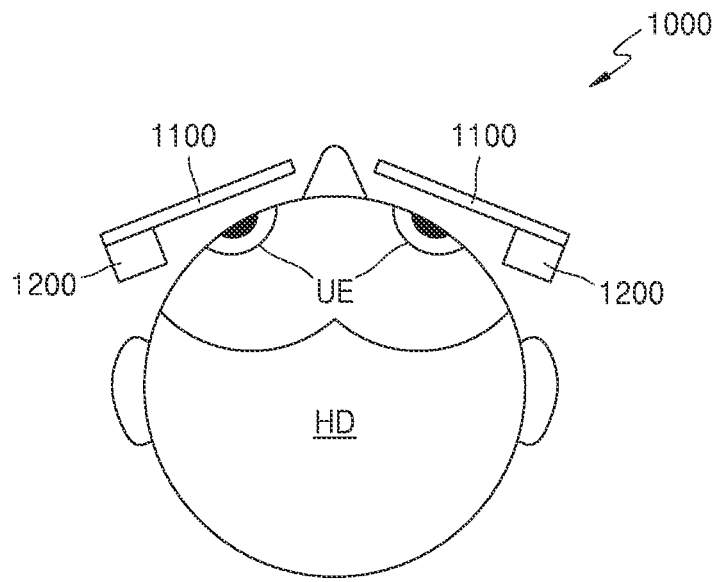
FIG. 9 is a diagram for explaining a head mounted display according to example embodiments.

FIG. 9 is a diagram for explaining an HMD 1000 according to an example embodiment.

Referring to FIG. 9, the HMD 1000 may include image generating devices 1200 and display devices 1100 serving as light sources.

The display device 1100 may be any one of the display devices 100, 101, 102, 103, and 104 described with reference to FIGS. 1 to 8. According to example embodiments, the image generating devices 1200 may be laser imaging light sources. According to example embodiments, the HMD 1000 may include a pair of display devices 1100 and image generating devices 1200 to respectively correspond to both of the user's eyes UEs.

According to example embodiments, the HMD 1000 may have a shape similar to glasses, and may be mounted on the user's head HD in a manner similar to glasses. According to example embodiments, the display devices 1100 may operate similar to a lens of eyeglasses, and may generate a virtual image directed to the user's eye UE.

According to example embodiments, by providing the HMD 1000 including the display devices 100, 101, 102, 103, and 104 described with reference to FIGS. 1 to 7, even when the user sees a virtual image and an external landscape at the same time, the user may not feel a sense of alienation, so an improved level of user experience may be provided to the user.

Figure 10:
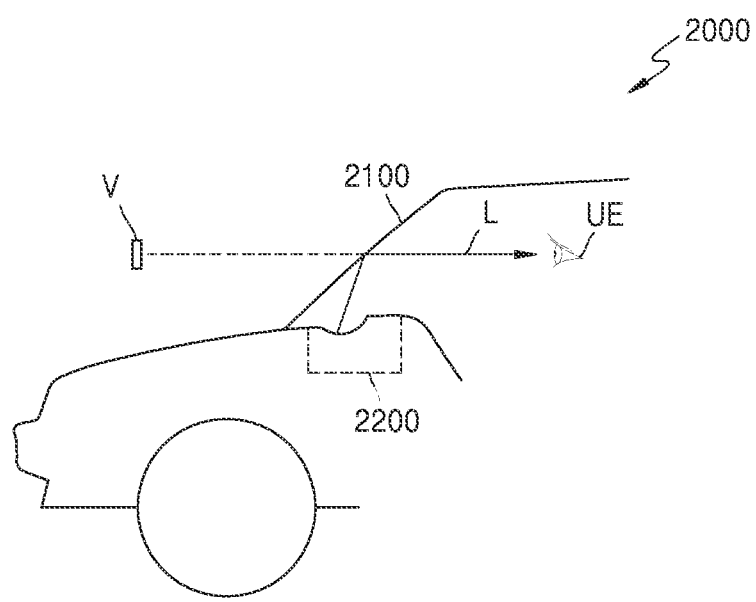
FIG. 10 is a diagram for describing a head up display according to example embodiments.

FIG. 10 is a diagram for describing an HUD 2000 according to an example embodiment.

Referring to FIG. 10, the HUD 2000 may include a display device 2100 constituting at least a portion of a windshield of a vehicle and an image generating device 2200 installed in a dashboard of the vehicle. The display light L projected by the HUD 2000 may be directed to the user's eye UE by the display device 2100. Accordingly, the user's virtual image V superimposed on the landscape may be visually recognized.

According to example embodiments, the HUD 2000 may be any one of the display devices 100, 101, 102, 103, and 104 described with reference to FIGS. 1 to 8. According to example embodiments, by providing the HMD 2000 including the display devices 100, 101, 102, 103, and 104 described with reference to FIGS. 1 to 8, even when the user sees the virtual image and the scenery outside the window at the same time, the user does not feel a sense of alienation, thereby reducing the risk of accidents and providing an improved level of user experience.

While example embodiments have been particularly shown and described with reference to the drawings, it will be understood that various changes in form and details may be made therein without departing from the spirit and scope of the following claims and their equivalent.

What is claimed is:

1. A display device comprising:
   a light guide plate;
   a plurality of reflective prisms configured to reflect an imaging beam toward the light guide plate, wherein the imaging beam reflected by each reflective prism of the plurality of reflective prisms travels within the light guide plate at an angle greater than a critical angle of the light guide plate; and
   a diffraction grating configured to diffract the imaging beam traveling within the light guide plate to an angle less than or equal to the critical angle of the light guide plate,
   wherein each reflective prism of the plurality of reflective prisms comprises a first surface in contact with the light guide plate, a second surface configured to reflect the imaging beam, and a third surface connected to the first surface and the second surface,
   wherein the imaging beam reflected by the second surface of each reflective prism of the plurality of reflective prisms travels in a direction away from the third surface of each reflective prism of the plurality of reflective prisms, and an angle of a travelling direction of the imaging beam with respect to the first surface is greater than an angle of the third surface with respect to the first surface,
   wherein the plurality of reflective prisms comprise a first reflective prism, a second reflective prism, and a third reflective prism, and
   wherein a first angle between the second surface and the first surface of the first reflective prism is greater than a second angle between the second surface and the first surface of the second reflective prism, and the second angle is greater than a third angle between the second surface and the first surface of the third reflective prism.

2. The display device of claim 1, wherein an angle between the second surface and the first surface is within a range of 22° to 37°.

3. The display device of claim 1, wherein an angle between the second surface and the first surface is within a range of 25° to 28°.

4. The display device of claim 1, wherein a reflectivity of the second surface with respect to the imaging beam is at least 90%.

5. The display device of claim 1, wherein the angle at which the imaging beam reflected by each reflective prism of the plurality of reflective prisms travels in the light guide plate is in a range of 31° to 46°.

6. The display device of claim 1, wherein the imaging beam is incident on an upper surface of the light guide plate, and
the plurality of reflective prisms are provided on a lower surface of the light guide plate opposite to the upper surface of the light guide plate.

7. The display device of claim 6, wherein the diffraction grating is provided on the upper surface of the light guide plate.

8. The display device of claim 6, wherein the diffraction grating is provided on the lower surface of the light guide plate.

9. The display device of claim 1, wherein the diffraction grating is further configured to transmit the diffracted imaging beam.

10. The display device of claim 1, wherein the diffraction grating is further configured to reflect the diffracted imaging beam.

11. A display device comprising:
a light guide plate;
a first reflective prism provided on a lower surface of the light guide plate and configured to reflect a first imaging beam incident on the light guide plate from an upper surface opposite to the lower surface of the light guide plate, wherein the first imaging beam reflected by the first reflective prism travels within the light guide plate at an angle greater than a critical angle of the light guide plate;
a second reflective prism provided on the lower surface of the light guide plate and configured to reflect a second imaging beam incident from the upper surface of the light guide plate to the light guide plate, wherein the second imaging beam reflected by the second reflective prism travels at an angle greater than the critical angle within the light guide plate;
a third reflective prism provided on the lower surface of the light guide plate and configured to reflect a third imaging beam incident on the light guide plate from the upper surface of the light guide plate, wherein the third imaging beam reflected by the third reflective prism travels within the light guide plate at an angle greater than the critical angle; and
a diffraction grating provided on the lower surface of the light guide plate and spaced apart from the first reflective prism, the second reflective prism, and the third reflective prism, the diffraction grating being configured to diffract each of the first imaging beam, the second imaging beam, and the third imaging beam to an angle less than or equal to the critical angle,
wherein the first reflective prism, the second reflective prism, and the third reflective prism are spaced apart in a first direction parallel to the lower surface of the light guide plate, and
wherein the diffraction grating is spaced apart from each of the first reflective prism, the second reflective prism, and the third reflective prism in a second direction parallel to the lower surface of the light guide plate and perpendicular to the first direction.

12. The display device of claim 11, wherein the first imaging beam is a blue visible light, the second imaging beam is a green visible light, and the third imaging beam is a red visible light.

13. The display device of claim 12, wherein the first reflective prism comprises a first surface in contact with the light guide plate, and a second surface configured to reflect the first imaging beam and provided at a first angle with respect to the first surface,
the second reflective prism comprises a third surface in contact with the light guide plate, and a fourth surface configured to reflect the second imaging beam and provided at a second angle with respect to the third surface, and
the third reflective prism comprises a fifth surface in contact with the light guide plate, and a sixth surface configured to reflect the third imaging beam and provided at a third angle with respect to the fifth surface.

14. The display device of claim 13, wherein the first angle is greater than the second angle, and the second angle is greater than the third angle.

15. The display device of claim 13, wherein each of the first angle, the second angle, and the third angle is within a range of 22° to 37°.

16. The display device of claim 13, wherein each of the first angle, the second angle, and the third angle is within a range of 25° to 28°.

17. A head mount display comprising:
a light guide plate comprising an upper surface on which an imaging beam is incident and a lower surface opposite to the upper surface;
a plurality of reflective prisms provided on the lower surface of the light guide plate; and
a diffraction grating provided on the lower surface of the light guide plate,
wherein a contact area between the diffraction grating and the light guide plate is greater than a contact area between each reflective prism of the plurality of reflective prisms and the light guide plate,
wherein each reflective prism of the plurality of reflective prisms is configured to reflect the imaging beam such that the imaging beam travels through total reflection within the light guide plate,
wherein the diffraction grating is configured to diffract the imaging beam such that the imaging beam is emitted from the light guide plate,
wherein each reflective prism of the plurality of reflective prisms comprises a first surface in contact with the light guide plate, a second surface configured to reflect the imaging beam, and a third surface connected to the first surface and the second surface,
wherein the imaging beam reflected by the second surface of each reflective prism of the plurality of reflective prisms travels in a direction away from the third surface of each reflective prism of the plurality of reflective prisms, and an angle of a travelling direction of the imaging beam with respect to the first surface is greater than an angle of the third surface with respect to the first surface,
wherein the plurality of reflective prisms comprise a first reflective prism, a second reflective prism, and a third reflective prism, and
wherein a first angle between the second surface and the first surface of the first reflective prism is greater than a second angle between the second surface and the first surface of the second reflective prism, and the second angle is greater than a third angle between the second surface and the first surface of the third reflective prism.

* * * * *